July 28, 1964   E. W. PRESBIE   3,142,541
GAS GENERATOR FOR ROCKET PROPELLANTS
Filed Aug. 18, 1961
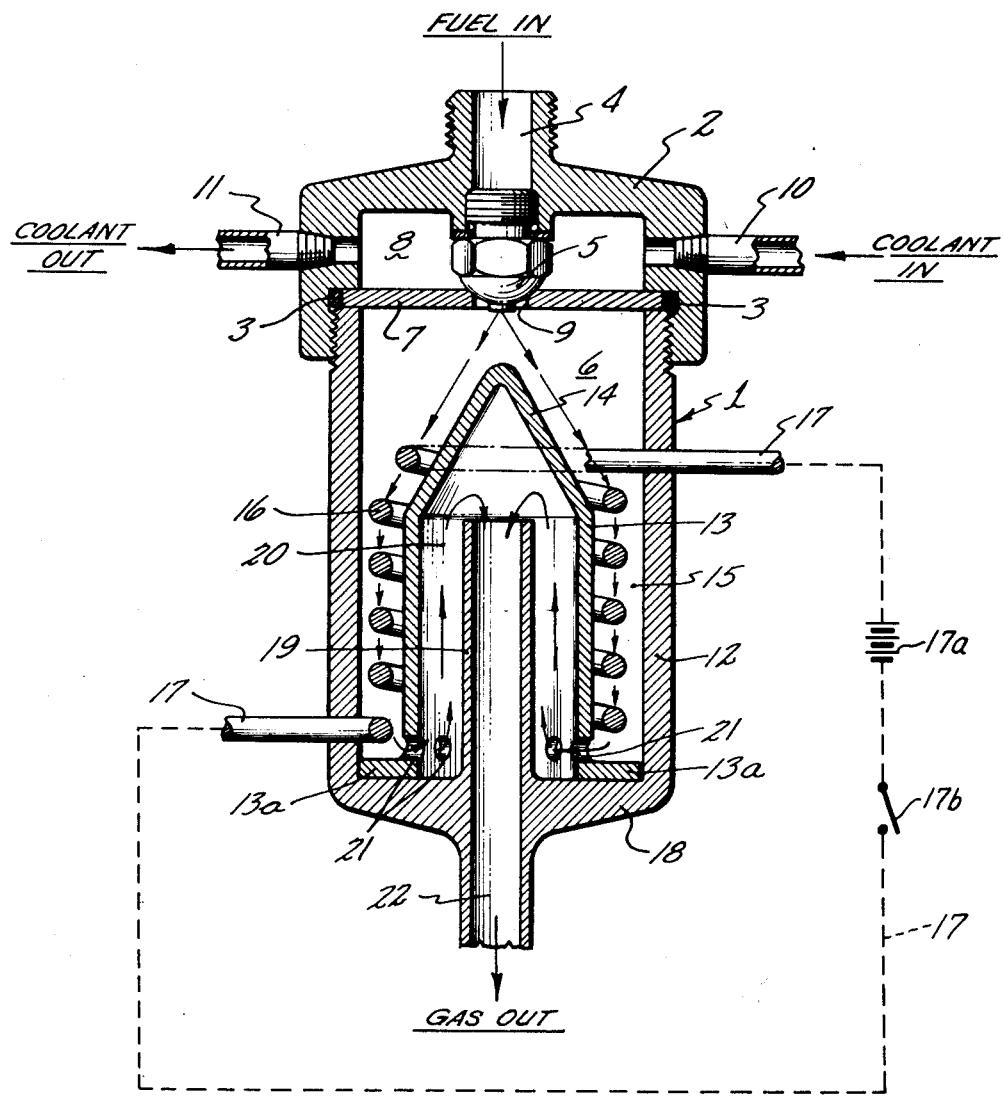
INVENTOR
EDWARD W. PRESBIE
BY
ATTORNEY

United States Patent Office 3,142,541
Patented July 28, 1964

3,142,541
GAS GENERATOR FOR ROCKET PROPELLANTS
Edward W. Presbie, Bloomfield, Conn., assignor to Chandler Evans Corporation, West Hartford, Conn., a corporation of Delaware
Filed Aug. 18, 1961, Ser. No. 132,402
4 Claims. (Cl. 23—281)

This invention pertains to gas generators, and more particularly has reference to gas generators of the thermal decomposition type, having means for insuring the complete conversion into gas of liquids with high latent heat of vaporization, such as rocket mono-propellant liquids.

Heretofore, generators for converting liquids to gases have generally comprised straight-through flow paths, which do not provide means to assure that the larger liquid particles will be broken up and completely vaporized in their passage through the generator; and such generators have not made use of regenerative heating in the vaporization process.

Accordingly, prior art gas generator have generally required vaporization chambers of large internal volume, for a given flow rate therethrough, in order to accomplish a given degree of conversion of liquid into gas. Such large volume devices are unsuitable from the standpoint of fast pressure build-up response, as now required for the conversion of rocket mono-propellant liquids into gases.

In addition to the foregoing, prior art gas generators have not been provided with means, whereby the heat released in the generator by the thermal decomposition of a portion of the liquid flowing thereinto, raises the temperature of a portion of said liquid to an extent sufficient to accomplish the vaporization and decomposition of all the injected liquid, without the need for supplying additional heat from an external source, such as electric current to operate heating coils.

In order to overcome the above-mentioned deficiencies of prior art gas generators, I have devised an improved type of gas generator having:

(a) Means to inject into a vaporization chamber a *uniform fine spray* of liquid propellant.

(b) Means to provide, in flow series with the vaporizing chamber, a decomposing chamber comprising a tortuous flow passage with a plurality of completely reversed turns, through which the the injected fluid flows, in order to further enhance its pulverization into smaller droplets, and accelerate its vaporization and decomposition by contact with the longer heated walls of said passage.

(c) Means to provide the quantity of heat necessary to vaporize and chemically decompose the propellant spray and cause it to be completely converted into gas.

(d) Means to completely convert all of the liquid propellant to gas in a generator of minimum internal volume.

(e) Means whereby, in operation of my generator of the smaller size spray droplets will take place at some portion of its flow passage prior to its first reverse turn, so that the as yet incompletely vaporized and decomposed particles, being unable to accomplish the reverse turn are splashed against the walls of the passageway thereby enhancing their vaporization within a small volume (and fast response) generator.

(f) Means for the regenerative heating of the vaporizing and decomposing chambers, by returning the hot decomposing gases through the former towards the latter chamber in the flow passage through the generators. This feature aids in the vaporization and decomposition of subsequently injected propellant since an extra source of heat is thus provided by the exothermic reaction of the decomposing gases.

With the foregoing and other objects in view, which may be incident to my improvements, my invention consists in the combination and arrangements of elements hereinafter described and illustrated in the accompanying drawing, which shows, in central vertical section (somewhat diagrammatic), a preferred embodiment of my invention, wherein the gas generator comprises a body casing 1, closed at its upper end by a screw-threaded cap 2, and an interposed gasket 3. Cap 2 is provided with a central passage 4 through which liquid propellant (e.g. *hydrazine*) is fed under pressure to a spray nozzle 5, which is specially designed and constructed to inject, the liquid into the upper portion 6 of said casing, in the form of a very fine spray.

An annular plate 7 separates a vaporizing chamber 6 in the upper portion of body 1 from a chamber 8 in the cap 2. Plate 7 has a central aperture 9 through which the nozzle 5 projects with a gas-tight fit. Liquid coolant (e.g. water) enters chamber 8 from a source of supply (not shown) through an inlet conduit 10 and is discharged through outlet conduit 11, whereby the nozzle 5 is cooled, so as to preclude vaporization of the liquid propellant before it issues from the nozzle.

In the lower portion 12 of body 1 is placed a cylindrical centerbody 13, forming with the sidewall of body portion 12 an annular passageway 15, and having at its bottom end an outwardly extending flange 13a which fits snugly in the bottom of lower portion 12 and serves to secure centerbody 13 in proper spaced relation to the side wall of body 1. Centerbody 13 is open at its lower end and is closed at its upper end by an integral, conical cap portion 14, over the outer-surface of which passes the spray of liquid propellant from nozzle 5.

In the annular space, 15 between centerbody 13 and lower portion 12 of body 1, is placed a helical coil 16 of electric resistance wire, which is supplied with electric current from a source, such as an electric battery 17a, through a manually-operated switch 17b and a connecting wire 17. The bottom wall 18 of body 1 is provided with an integral, upwardly extending sleeve 19, which is open at its upper end and communicates with the annular space 20 between sleeve 19 and the sidewall of center body 13. A plurality of apertures 21 near the lower end of centerbody 13 permits the escape of fluid from annular space 15 into space 20 from which it flows through sleeve 19 to connecting gas outlet 22.

From the above-described arrangement of elements, it will be seen that the liquid droplets of the propellant spray discharged from nozzle 5 travel downwardly over the outer surface of centerbody 13 and coil 16 (in space 15), whereby said droplets are heated and partially vaporized. Upon reaching the bottom of space 15, the gas generated by the vaporized smaller droplets, and the larger liquid droplets of propellant, travel upwardly in space 20 where they are further heated until all of the liquid propellant is converted into gas, which escapes downwardly through sleeve 19 and is discharged from the generator through outlet conduit 22.

As the spray droplets travel downwardly through space 15, their temperature is raised until decomposition of the smaller size droplets takes place, in the lower portion of space 15 before reaching apertures 21. However, owing to the 180° reverse turn in the flow path from space 15 into space 20, the larger, and as yet incompletely vaporized, droplets will be unable to make this sharp turn and will therefore be splashed against the walls of space 15, thereby enhancing their vaporization within a relatively small (and fast response) chamber.

The decomposition of the smaller droplets which are decomposed in space 15 heats up the walls of the lower portion 12 of body 1 and the side walls of centerbody 13, and the decomposition of the remaining larger droplets in space 20 is a highly exothermic reaction which adds more heat to the walls of centerbody 13 and sleeve 19, so that by the time the fluid propellant reaches the bottom of sleeve 19, all of the liquid droplets discharged from the nozzle 5 have been completely converted to gas.

The 180° reverse turns which the fluid propellant has to make in its passage from space 15 to 20 and from space 20 to sleeve 19, serve not only to increase the length of the flow path of said fluid, but also serve to slow down the rate of fluid flow through this tortuous path; both of which enhance the process of vaporization and decomposition.

In the operation of my improved gas generator, the use of the heating coil 16 is required only during the starting phase, and the current to coil 16 is then shut off when decomposition in space 15 has taken place, since the decomposition of propellant in spaces 15 and 20 furnishes sufficient heat to completely convert all of the liquid propellant to gas.

An important feature of my invention is the regenerative heating of the *vaporizing chamber* 6 and the decomposing chamber which comprises passages 15 and 20 which is accomplished by returning the hot decomposing gases toward the vaporizing chamber 6, as provided by the flow passage in passages 15 and 20. This feature aids in the vaporization and decomposition of the subsequently injected liquid propellant since the heat of decomposition is utilized to heat centerbody 13, and particularly the mass of metal in conical cap 14.

From the foregoing description of my improved gas generator it will be understood that it comprises essentially a vaporizing chamber 6, for initially heating and vaporizing the injected liquid spray, connected in flow series with a thermal decomposition chamber, comprising reversed passages 15 and 20 wherein the liquid propellant flowing therethrough is further heated by heat derived from the exothermic reaction of the decomposing gases in passages 15 and 20, whereby all of the liquid propellant is completely converted into gas before it is discharged from the generator.

In contrast to my improved gas generator, prior art generators have only straight-through flow paths, which do not provide any means to assure that the larger liquid particles will be broken up and vaporized; and such prior art generators do not make use of regenerative heating to aid the vaporization process. Also, prior art gas generators have vaporizing chambers of relatively large internal volume, for a given flow rate therethrough, in order to accomplish a given degree of completeness of conversion of liquid into gas. Such large volume devices are unsuitable from the standpoint of obtaining fast pressure build-up responses, such as occurs in my improved gas generator.

The regenerating feature of my invention, whereby the complete conversion into gas of the injected liquid propellant is accomplished (after the inital starting period) without the need for additional heat from an external source (such as electric power input into a heating coil), has the following additional advantages:

(*a*) Provides a "fail safe" feature;

(*b*) Reduces the total power input during a period of operation; or (*c*) Increases the life of the electric heating coil, since the chemical decomposition temperature may be less than the energized coil temperature.

While I have shown and described the preferred embodiment of my invention, I wish it to be understood that I do not limit the invention to the details of construction and arrangement of elements disclosed by way of illustration, as these may be altered and changed by those skilled in the art, without departing from the spirit of my invention, nor exceeding the scope of the appended claims.

I claim:

1. A gas generator for converting into gas a vaporizable and thermally decomposable liquid propellant, having a highly exothermic decomposing reaction, comprising: a vaporizing chamber with first means for injecting thereinto such liquid in the form of fine spray; said chamber being connected in flow series with a decomposition chamber; both of said chambers being adapted to exclude atmospheric oxygen; said decomposition chamber comprising a plurality of connected, reversed passageways, so constructed and arranged as to supply to said propellant, in both of said chambers, heat derived solely from the exothermic decomposition of the vaporized liquid spray in said decomposition chamber, sufficient to completely convert all of said liquid into gas before its discharge from said generator; said decomposition chamber including an electric heating element which is energized from a source external to said generator, and manually-operable means for energizing and de-energizing said element, so that said spray is heated by said element only until its vaporized portion is thermally decomposed.

2. A gas generator according to claim 1, wherein said heating element comprises a helical coil of electric resistance wire which converts into heat electric current supplied thereto from said source; said coil having a plurality of loops arranged serially in the flow path of said spray, so as to progressively raise the temperature of said spray during its passage over said coil.

3. A gas generator according to claim 1, wherein said decomposition chamber is provided with an upwardly projecting tubular sleeve, and a surrounding cylindrical centerbody, having a sidewall with a plurality of apertures near its lower end; said centerbody being disposed in spaced relation with said sleeve, so as to divide the space between the outer wall of said generator and said sleeve into two concentric, annular passages, which communicate through said apertures and form a tortuous flow path with two 180° reverse turns, through which the vaporized and unvaporized portions of said spray travel in passing through said chamber.

4. A gas generator according to claim 3, wherein said centerbody is provided with a conical cap, which closes its upper end and projects into the flow path of the unvaporized spray issuing from said first means, whereby the heat of decomposition of the vaporized spray in said tortuous flow path is transmitted to the unvaporized spray issuing from said first means, thereby vaporizing a portion of said unvaporized spray.

References Cited in the file of this patent

UNITED STATES PATENTS

| | | |
|---|---|---|
| 1,068,708 | Southey | July 29, 1913 |
| 1,120,857 | Southey | Dec. 15, 1914 |
| 1,121,868 | Riotte et al. | Dec. 22, 1914 |
| 1,967,669 | Hickey | July 24, 1934 |
| 2,368,179 | Turpin | Jan. 30, 1945 |
| 2,415,748 | Lowell | Feb. 11, 1947 |
| 2,705,399 | Allen | April 5, 1955 |
| 2,727,358 | Howes | Dec. 20, 1955 |
| 2,925,329 | Yost | Feb. 16, 1960 |